Patented Oct. 17, 1939

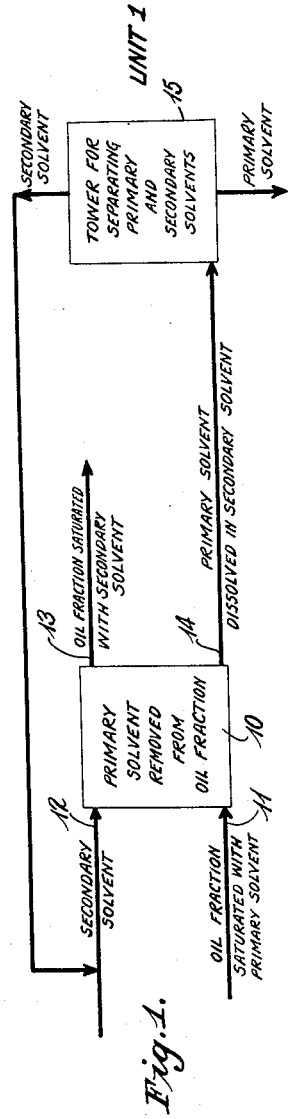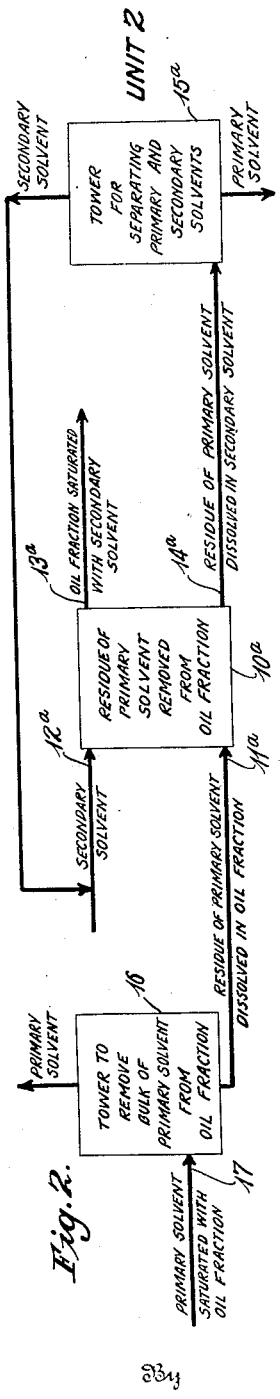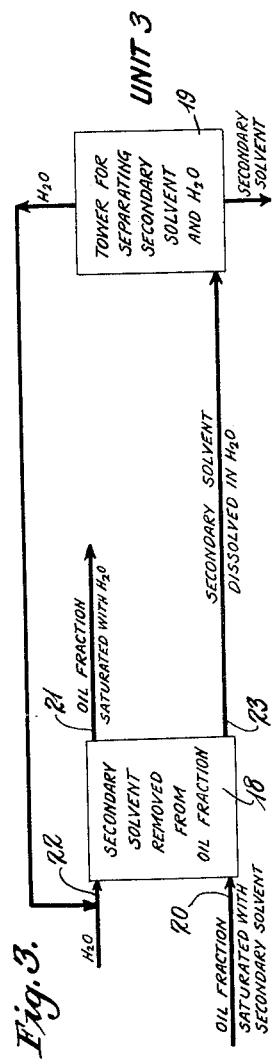

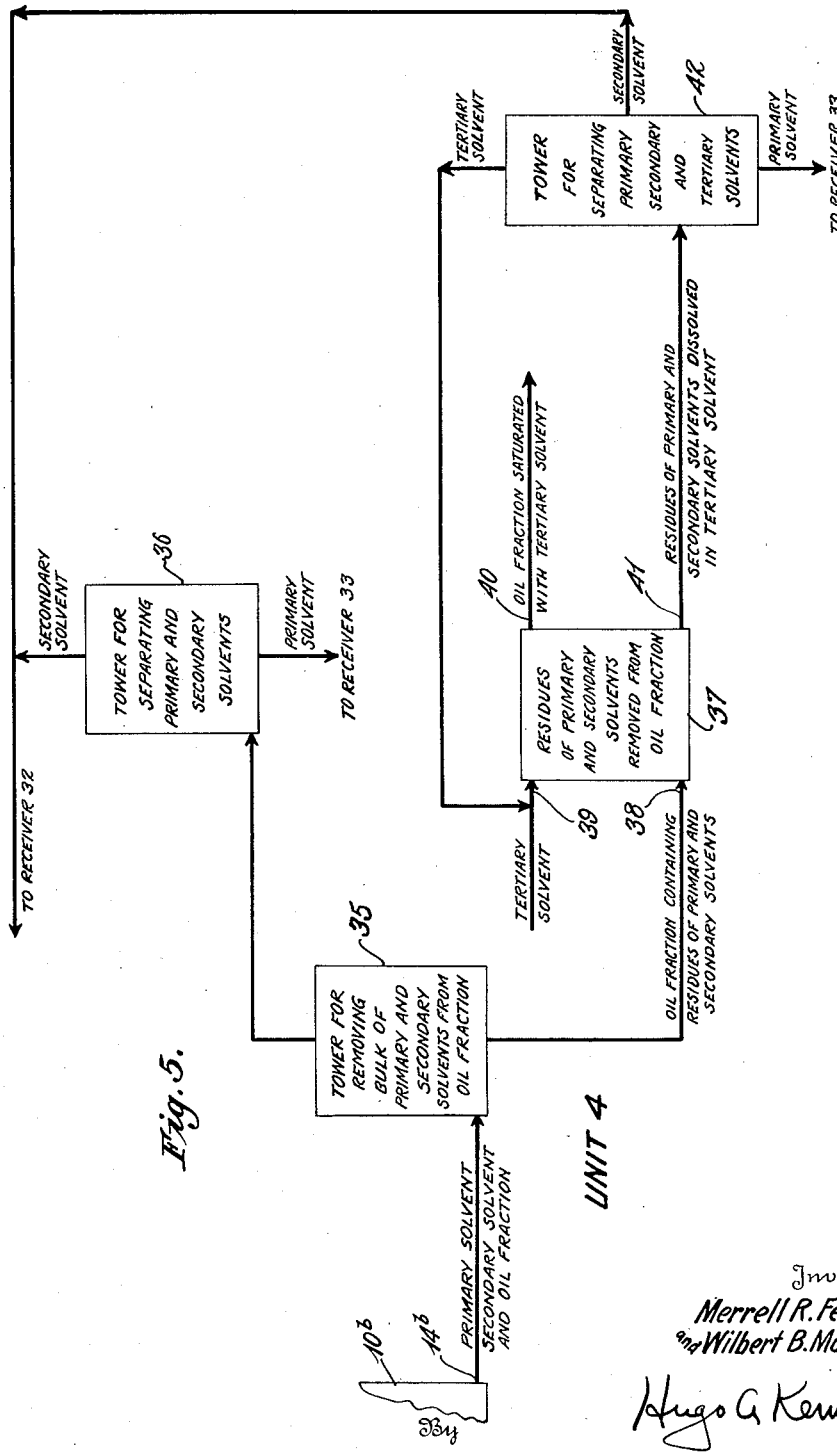

2,176,396

UNITED STATES PATENT OFFICE 2,176,396

PROCESS FOR TREATING MINERAL OILS

Merrell R. Fenske and Wilbert B. McCluer, State College, Pa., assignors to Pennsylvania Petroleum Research Corporation, a corporation of Pennsylvania Application June 21, 1934, Serial No. 731,779

10 Claims. (Cl. 196—13)

This invention pertains generally to the recovery of solvents from solution in liquids and particularly from solution in petroleum oil fractions obtained in solvent extraction processes.

A common procedure in the art for the removal and recovery of solvents from products treated therewith and particularly from the petroleum oil fractions obtained in solvent extraction processes is to subject the mixture of oil and solvent to distillation. It is found, however, that it is frequently difficult to completely remove the solvent from the oil. In many cases some degradation of the oil will result even though the distillation proceeds under vacuum. This is particularly true if the solvent is high boiling. In some cases it is difficult to proceed without causing a reaction between the solvent and the oil. The result is that in many cases the cost of solvent recovery by distillation is excessive, the loss in solvent large, and/or the product degradated in some respect.

The above difficulties reside at least in part in the necessity of using relatively high temperatures in distillation processes. The volatility of a solvent dissolved in oil is considerably lower than that of the pure solvent. This decrease in volatility increases appreciably with decrease in concentration of the solvent dissolved in the oil, so that relatively high temperatures cannot be avoided if substantially complete removal of solvent is desired.

In accordance with one embodiment of the present invention the solvent (hereinafter referred to as the primary solvent) may be removed from the oil and recovered by extracting the primary solvent from the oil with a second solvent (hereinafter referred to as the secondary solvent). The secondary solvent has among its characteristics a reasonably high solubility in water and is in turn removed from the oil by contacting the oil with water.

The process is preferably carried out in continuous countercurrent since maximum advantage can thus be taken of the distribution ratio throughout the path of contact between the secondary solvent and the oil, or the water and the oil as the case may be. This is particularly true when means are provided for efficient contact and for the prevention of channeling.

By this means the last vestige of primary solvent is removed from the oil and is displaced from the oil by the secondary solvent. The last vestige of the secondary solvent is in turn removed from the oil and is substituted therein by water. Water has a very low solubility in petroleum oil and the very small amount which may remain therein after the process is complete may be readily separated by any of the well-known processes for dehydrating oil.

In the embodiment under consideration, the secondary solvent is generally characterized (1) by having a relatively high solubility for the primary solvent, (2) by having a relatively low solubility for the oil, (3) by having a reasonable solubility in water (or some similar material which is inexpensive), and (4) by having physical characteristics such as boiling point which facilitate its separation from water.

The characteristics of the secondary solvent may, of course, vary from the foregoing which is employed for the purposes of illustration.

For instance, the secondary solvent might be relatively highly soluble in oil and might be employed, for instance, as a diluent and/or refrigerant in known processes for dewaxing, or the secondary solvent might be employed for any other purpose in addition to that of scrubbing the primary solvent from the oil, for instance for further extraction.

In another embodiment of the invention, the secondary solvent has a relatively high solubility for the primary solvent so as to remove the primary solvent from the oil, and also has a relatively high selective solubility for certain constituents of the oil, such constituents, for instance, being different from those for which the primary solvent is selective. In this case, a tertiary solvent, which may have characteristics similar to those specifically set forth for the secondary solvent in the first embodiment, is employed to remove the secondary solvent from the oil. The tertiary solvent is then in turn removed from the oil by contacting the oil with water.

The latter embodiment of the invention lends itself to a wide variety of different applications. For instance, should the primary solvent be selective as to molecular type, the secondary solvent may be selective as to molecular size; or if the primary solvent is selective as to molecular size, the secondary solvent may be selective as to molecular type. Or, the primary and secondary solvents may be selective as to different molecular types; for instance, one may be selective as to naphthenes and the other as to paraffins.

In another application of the latter embodiment, the primary solvent may be selective as to either molecular type or size and the secondary solvent may be employed not only to scrub the primary solvent from the oil, but also to introduce into solution with the oil a diluent to facilitate removal of wax from the oil.

In a further application of the latter embodiment of the invention, the secondary solvent may act not only to scrub the primary solvent from the oil, but also to introduce into solution with the oil a refrigerant to facilitate wax removal. That is, the secondary solvent may be characterized by having a relatively high vapor pressure, so that by reduction of the total pressure vaporization of the secondary solvent may take place at such a rate as to act as a refrigerant in a well-known manner.

The secondary solvent might be employed for a purpose other than above set forth in addition to scrubbing out the primary solvent.

In the latter embodiment of the invention, the tertiary solvent might also be employed for a purpose in addition to that of scrubbing out. For instance, should the secondary solvent be employed as a diluent, the tertiary solvent might be employed as a refrigerant or vice versa.

In a further embodiment of the invention, a quaternary solvent may be employed to scrub out the tertiary solvent, the quaternary solvent being in turn scrubbed out by water. For instance, the primary solvent may be selective as to type of molecule, the secondary solvent as to size of molecule, the tertiary solvent may be a diluent or a refrigerant, and the quaternary solvent merely a scrubber; or the primary solvent may be selective as to one type of molecule, the secondary solvent selective as to a different type of molecule, the tertiary solvent may be a diluent or a refrigerant, and the quaternary solvent may be merely a scrubber; or in the latter case, the tertiary solvent may be a diluent and the quaternary solvent a refrigerant or vice versa.

In a still further embodiment of the invention, a quinary solvent might be employed for the purpose of making possible the combination of any desired number and order of the foregoing steps. In fact, a sixth or any larger number of solvents might be added in the application of the foregoing principles.

Solvent removal by means of this invention opens up an entirely new field of solvents suitable for extraction purposes, since such removal is entirely independent of the vapor pressure of the solvent. Therefore solvents of extremely low volatility may be employed.

Further features of the invention will become more apparent as the specification proceeds and upon reference to the drawings in which:

Fig. 1 is a flow-sheet illustrating one unit of the invention;

Fig. 2 is a flow-sheet illustrating a second unit of the invention;

Fig. 3 is a flow-sheet illustrating a third unit of the invention;

Fig. 5 is a flow-sheet illustrating a fourth unit of the invention.

Figure 4:
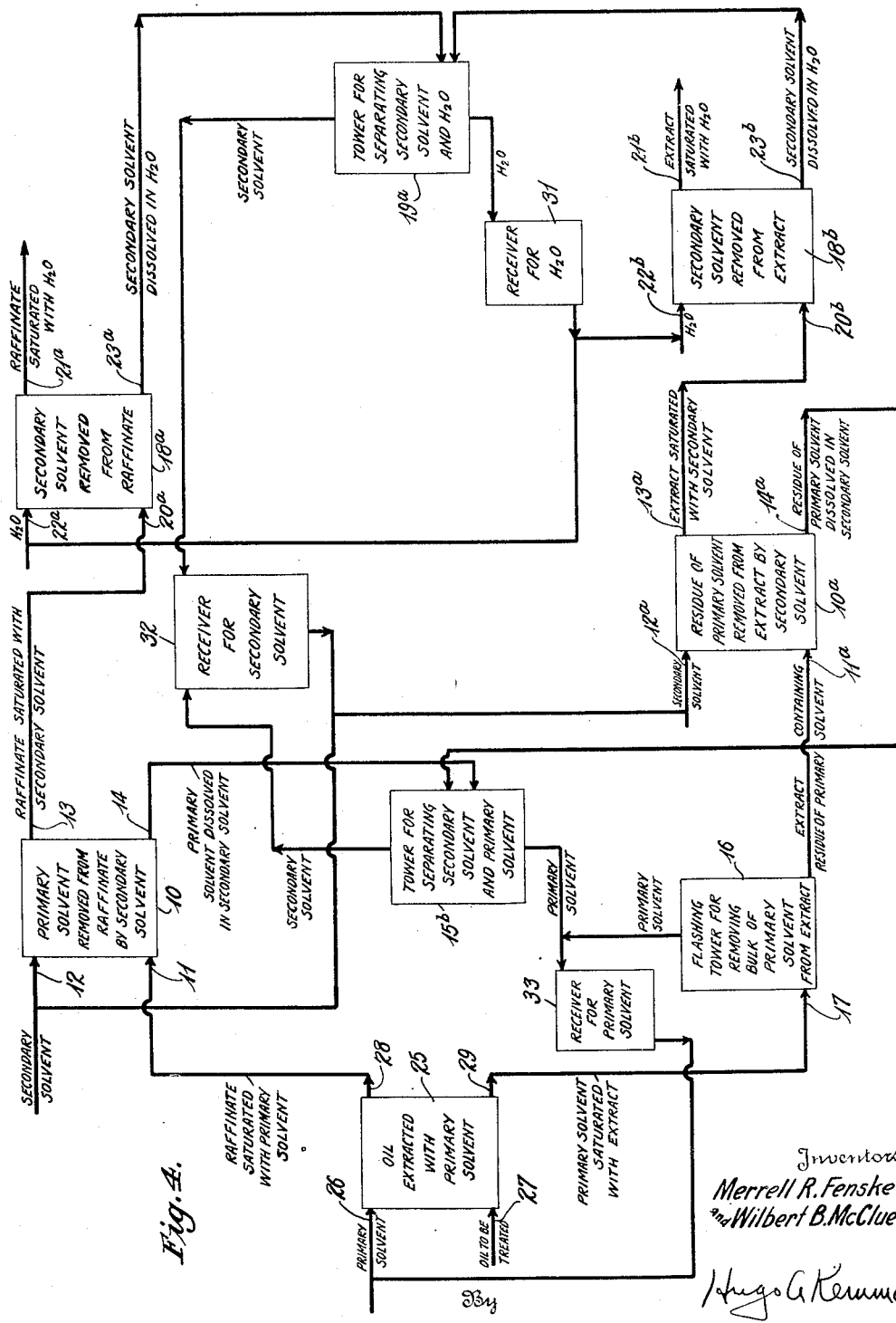
Fig. 4 is a flow-sheet illustrating one manner of combining the first, second, and third units into a complete system.

In the usual solvent extraction processes, two nonmiscible solutions are generally formed, one comprising the bulk of the solvent saturated with a part of the oil (extract), hereinafter referred to as the solvent-oil solution, and the other comprising the rest of the oil (raffinate) saturated with solvent, hereinafter referred to as the oil-solvent solution.

The term "extract" as used herein refers to the dissolved part of the oil, whether the solvent is selective as to type or size of molecule or both, and the term "raffinate" as used herein refers to the undissolved part of the oil, whether the solvent is selective as to type or size of molecule or both.

After separation of the two solutions, the problem becomes one of removing the solvent from each oil fraction as previously pointed out.

Although either unit 1 or unit 2 may be employed for scrubbing the primary solvent from either oil fraction by means of a secondary solvent, unit 1 applies more particularly to scrubbing the solvent from the raffinate and unit 2 applies more particularly to separation of the solvent and extract.

In the flow-sheets of Figures 1 and 2 as well as in the other flow-sheets of the drawings, no particular attention has been paid to relative specific gravities or relative vapor pressures in indicating the points of entry and exit of the various fluids involved. The correct point of entry or exit in each case will become apparent to persons skilled in the art upon becoming familiar with this invention.

Referring now more particularly to Fig. 1, 10 indicates a contact device for scrubbing a primary solvent out of solution with an oil fraction, for instance raffinate by means of a secondary solvent. The solution of oil and solvent is indicated as entering the device 10 at 11 and the secondary solvent as entering device 10 at 12. Device 10 may be of the batch type wherein the liquids are permitted to settle and form into a two-layer system or may be of any other suitable type. A tower permitting continuous countercurrent contact is particularly efficient. The latter is particularly true when means are employed for efficient contact and for the prevention of channelling, with or without simulations of reflux.

The oil fraction saturated with the secondary solvent is indicated as leaving device 10 at 13 and the primary solvent dissolved in the secondary solvent is indicated as leaving the device 10 at 14.

The result is that the secondary solvent has been substituted in the oil fraction for the primary solvent, the primary solvent being wholly dissolved in the secondary solvent.

Separation of the primary and secondary solvents may be effected in a tower indicated at 15, the secondary solvent being returned to inlet 12. The primary solvent may be returned to the initial solvent extraction contacting device not shown.

Unit 2 of Fig. 2 is in all respects similar to unit 1 of Fig. 1 except that a tower 16 is provided between inlet 11a of contacting device 10a and the initial solvent extraction contacting device not shown.

Since the solvent-oil solution contains the bulk of the solvent, a large part of which in many cases may be removed more efficiently by distillation, this solution is preferably in the cases indicated flowed first through tower 16 to remove the bulk of the primary solvent from the extract, and the residuum comprising the extract containing the residue of the primary solvent is delivered to the device 10a at 11a. The residue of the primary solvent is scrubbed out of the extract by the secondary solvent in the device at 10a.

The extract saturated with secondary solvent leaves device 10a at 13a and the residue of primary solvent dissolved in secondary solvent leaves device 10a at 14a. Separation of primary and secondary solvents takes place in the tower 15a, the secondary solvent being returned to 12a, and the primary solvent being returned to the initial solvent extraction device not shown.

The result of the operation of units 1 and 2 is that we have one oil fraction, for instance, raffinate saturated with secondary solvent at 13 and another oil fraction, for instance, extract saturated with secondary solvent at 13a.

The problem now becomes one of separating the secondary solvent from either oil fraction. This is accomplished by unit 3 diagrammatically illustrated in Fig. 3.

Unit 3 comprises a contact device 18 for contacting either solution of oil and secondary solvent with water and tower 19 for separating the secondary solvent from water. The oil fraction saturated with secondary solvent enters device 18 at 20 and leaves device 18 at 21 saturated with water. Water enters device 18 at 22 and leaves at 23 containing all of the secondary solvent. The secondary solvent and water are separated in tower 19, the water being returned to 22 and the secondary solvent being returned to either 12 or 12a as the case may be.

In Fig. 4 is shown a combination of units 1, 2, and 3.

In Fig. 4 the initial solvent extraction contact device is illustrated at 25 as having an inlet 26 for primary solvent and inlet 27 for fresh oil and outlet 28 for the raffinate saturated with primary solvent and an outlet 29 for primary solvent saturated with extract. The raffinate saturated with primary solvent flows to the contact device 10 wherein the primary solvent is scrubbed from the raffinate by the secondary solvent. The raffinate saturated with secondary solvent flows on to the contact device 18a wherein the secondary solvent is scrubbed from the raffinate by means of water. The raffinate saturated with water flows from the contact device 18a at 21a and may be dehydrated if necessary or desired.

The secondary solvent dissolved in water flows from contact device 18a to the tower 19a wherein separation is effected, the water being collected in receiver 31 and the secondary solvent in receiver 32. Water from receiver 31 may be returned to 22a and secondary solvent from receiver 32 may be returned to 12.

Separation of the primary and secondary solvents from their solution leaving contact device 10 is effected in tower 15b, the secondary solvent being collected in receiver 32 and the primary solvent in receiver 33.

This completes the cycle with respect to the raffinate.

It will be noted that the primary and secondary solvents and the water are recycled. Since each of the solvents and the water are recycled, a 100% separation from each other is unnecessary, and for purposes of economy in operation may not be desired. It is merely necessary that water, secondary solvent, and primary solvent greatly preponderate in receivers 31, 32, and 33 respectively. A small quantity of either of the others in any one receiver may generally be neglected, depending, of course, upon the solvents employed.

Referring now to the solution comprising primary solvent saturated with extract which leaves contact device 25 at 29, this solution passes into tower 16 wherein the bulk of the primary solvent is separated. The primary solvent thus separated is collected in receiver 33 from which it may be returned to 26. The residuum from tower 16 comprising extract containing the residue of primary solvent is delivered to contact device 10a at 11a and is scrubbed therein by secondary solvent entering at 12a.

The extract saturated with secondary solvent leaves contact device 10a at 13a and is delivered to contact device 18b wherein the secondary solvent is scrubbed from the extract by means of water.

The extract saturated with water leaves contact device 18b at 21b and may be dehydrated if necessary or desired.

The residue of primary solvent dissolved in secondary solvent leaving contact device 10a at 14a flows to tower 15b where the solution of the two solvents is separated in common with the separation of the solution of the same solvents flowing from contact device 10, each solvent being collected in its respective receiver. The solution of secondary solvent dissolved in water leaving contact device 18b at 23a flows to tower 19a wherein the solution is separated, the same as the solution of the same substances flowing from contact device 18a is separated, the secondary solvent and water being collected in their respective receivers to wit 32 and 31 respectively.

Secondary solvent is recycled from receiver 32 through contact device 10a and water is recycled from receiver 31 through contact device 18b.

In the foregoing system, it is merely necessary to add sufficient primary solvent, secondary solvent, and water to make up for unavoidable losses. This addition may be made at the respective receivers or at the points of entry of the respective liquids in the various contact devices or otherwise.

By combining units 1, 2, and 3 as illustrated in Fig. 4, the number of towers has been reduced from 5 to 3.

It should be noted that all of the towers may operate at atmospheric pressure and at relatively low temperatures whereas a vacuum and relatively higher temperatures are required to distill solvent from oil. Distilling under vacuum is expensive and high temperatures tend to crack and therefore degrade the oil.

To scrub the secondary solvent from the raffinate with a tertiary solvent and to then scrub the tertiary solvent from the raffinate with water, it is merely necessary to insert an additional unit 1 shown in Fig. 1 (or a unit 2 shown in Fig. 2) between outlet 13 of contact device 10 of Fig. 4 and inlet 20a of contact device 18a also of Fig. 4. In this event, outlet 13 of Fig. 4 would be connected to inlet 11 of Fig. 1 (or inlet 17 of Fig. 2) and outlet 13 of Fig. 1 would be connected to inlet 20a of Fig. 4. If a flow-sheet were prepared for such an arrangement, the word primary as appearing in Fig. 1 (or Fig. 2) on such flow-sheet would read secondary and the word secondary of Fig. 1 (or Fig. 2) would be changed to tertiary.

If a quaternary solvent were employed to scrub the tertiary solvent from the raffinate, two units would be connected in tandem between contact devices 10 and 18a of Fig. 4, the outlet 13 of one unit being connected to the inlet 11 of the next unit. For the second such unit, the wording of Fig. 1 (or Fig. 2) would be changed from primary to tertiary and from secondary to quaternary.

If a quinary solvent were employed to scrub out the quaternary solvent, three units as shown in Fig. 1 and/or Fig. 2 would be connected in tandem in the same manner between receivers 10 and 18a.

It will thus be seen that any number of units which might be connected between contact devices 10 and 18a of Fig. 4 depending upon the number of solvents employed before the last solvent is scrubbed out with water or other fluid of similar cost and efficiency.

To scrub the secondary solvent from the extract with a tertiary solvent, a single unit 1 (or unit 2) may be connected between outlet 13a of contact device 10a and inlet 20b of contact device 18b. Two units might be connected in tandem if the tertiary solvent is to be scrubbed out by a quaternary solvent, or three units might be connected in tandem if the quaternary solvent is to be scrubbed out with a quinary solvent, etc.

Towers need not be duplicated in cases where the same substances are to be separated.

In the foregoing particular description of Figures 1, 2, 3, and 4, it has been assumed that each of the solvents except the primary solvent has a relatively low solubility for the oil and that each succeeding solvent has a relatively high solubility for the next preceding solvent, but, in a specific case, not for the second preceding solvent.

Unit 2 would be employed in preference to unit 1 in cases where large quantities of solvent are to be removed from the respective oil fraction for instance for the removal of a diluent.

In the event that a succeeding solvent, for instance the secondary solvent, is not only employed to scrub the primary solvent from either the raffinate or extract, but is also employed for further extraction purposes; that is, to also dissolve a part of the oil, it will be seen that the solution leaving at 14 or the solution leaving at 14a of Fig. 4 will comprise primary solvent, secondary solvent, and an oil fraction. Furthermore, each such solution if there is more than one must be handled separately from the others, since the oil fraction will be different in each case. Since it now becomes necessary to not only separate primary solvent from secondary solvent, but also both solvents from the oil fraction, tower 15b of Fig. 4 can no longer be employed and it becomes necessary to treat the solutions delivered at 14 and 14a in a different manner.

A unit for this purpose is illustrated in Fig. 5 wherein contact device 10b corresponds to either contact device 10 or 10a of Fig. 4. The solution of primary solvent, secondary solvent, and oil fraction leaving contact device 10b at 14b is delivered to a tower 35 wherein the bulk of the primary and secondary solvents are removed from the oil fraction. The primary and secondary solvents stripped from the oil fraction in tower 35 are delivered to tower 36 where the two solvents are in turn separated, the secondary solvent being delivered to receiver 32 and the primary solvent to receiver 33.

The residuum of tower 35 comprising the oil fraction containing residues of primary and secondary solvents is delivered to contact device 37 at 38 wherein the primary and secondary solvents are scrubbed from the oil fraction by means of a tertiary solvent entering at 39.

The oil fraction saturated with tertiary solvent leaves contact device 37 at 40 and this solution may be delivered to contact device 18a or 18b at 20a or 20b respectively in Fig. 4 for scrubbing the tertiary solvent from the oil fraction with water as the case may be, or may be connected to the inlet of either an additional unit 1, an additional unit 2 or an additional unit 4 as desired, the outlets of which may in turn either lead to additional units 1, 2, or 4 or to a unit 3.

The residues of primary and secondary solvents dissolved in the tertiary solvent leave contact device 37 at 41 and may be separated in tower 42 or equivalent device or devices for the separation of the three solvents, the tertiary solvent being returned to inlets 39, the secondary solvent to receiver 32, and the primary solvent to receiver 33.

Towers 35 and 36 of Fig. 5 may be eliminated if desired, in which case outlet 14b would be connected directly to inlet 38. Furthermore, the tertiary solvent might be water, in which case the oil fraction leaving at 40 would be finished except for dehydration if found necessary or desirable.

In specific examples of the process in which the secondary solvent is employed to scrub the primary solvent from the oil and the secondary solvent is in turn scrubbed from the oil by water, the primary solvent might be nitrobenzene, aniline, beta beta dichlorethyl ether (Chlorex), xylidine, cresylic acid, phenol, or mixed toluidines, and the secondary solvent might be methyl or ethyl alcohol, acetone, or methyl acetate.

It will, of course, be understood that the contacting temperature of the secondary solvent with the primary solvent or of the water with the secondary solvent will be such that the desired degree of miscibility between the primary and secondary solvents and between the secondary solvent and water is obtained.

It is also to be understood that although the oil may be slightly soluble in the secondary solvent, the operating temperature may be such that only negligible amounts of oil will be dissolved in the secondary solvent, or if an appreciable amount is carried along with the mixture of primary and secondary solvent such mixture may be separated into its constituents by a unit 4.

If it is desired that the secondary solvent act as a diluent, a suitable diluent may be employed, or if it is desired that the secondary solvent act as a refrigerant, a suitable refrigerant such as methyl ether may be employed. These in turn may be scrubbed out by water after they have served their purpose.

The primary solvents above set forth are more or less recognized as being selective as to type of molecule. Examples of primary solvents which are selective as to size of molecule are normal amyl alcohol, iso amyl alcohol, secondary amyl alcohol, tertiary butyl alcohol, secondary butyl alcohol and secondary butyl carbonal, as described and claimed in our copending application, Serial No. 731,778, filed June 21, 1934.

In examples of the use of a primary solvent, a secondary solvent, and a tertiary solvent, any of the above-mentioned group of solvents selective as to type might be used as the primary solvent and any of the above-mentioned solvents selective as to size might be used as the secondary solvent or vice versa. In this case, the tertiary solvent might be methanol, acetone, or methyl acetate which in turn would be removed from the oil fraction by water.

On the other hand the primary solvent might be either selective as to size of molecule or as to type of molecule and might be scrubbed out by a diluent (as a secondary solvent) which might be employed for wax removal purposes. Acetone might then be employed as the tertiary solvent followed by water to scrub out the acetone. Or the secondary solvent might be a refrigerant such as dichlormethane.

In an example of the use of primary, secondary, tertiary, and quaternary solvents, the primary solvent might be selective as to either size or type of oil molecule; that is, any of the primary solvents above listed, the secondary solvent might be a diluent, the tertiary solvent might be a refrigerant such as dichlormethane, the quaternary solvent might be a scrubber such as acetone which in turn might be scrubbed out by water.

In an example of the use of primary, secondary, tertiary, quaternary, and quinary solvents, the primary solvent might be selective as to type or size of molecule, the secondary solvent might be selective as to size or type of molecule, the tertiary solvent might be a diluent, the quaternary solvent might be a refrigerant such as dichlormethane, the quinary solvent might be acetone which in turn might be scrubbed out by water.

It is of course to be understood that appropriate apparatus would be employed for dewaxing purposes and that the diluent-oil solution or refrigerant-oil solution as the case may be would be manipulated in such apparatus before removal of the diluent or refrigerant by the method herein set forth.

It will be noted that the solvent which is scrubbed out with water is necessarily water soluble. When this solvent is used merely as a scrubber and the preceding solvent is also soluble in water, it may be omitted. Its use as a scrubber is primarily as an intermediate between a non-water soluble solvent (which term includes solvents only partially miscible with water) and water. Therefore, when the primary solvent is completely miscible with water it may be scrubbed out directly with water which may be broadly considered as the secondary solvent.

Having described our invention, it is to be understood that the same is for the purposes of illustration, and that changes, omissions, additions, substitutions, and/or modifications might be made in the same without departing from the spirit thereof. The claims, therefore, are intended to be limited only as required by the prior art.

We claim:

1. A process for removing a solvent not completely miscible with water from a petroleum oil fraction, comprising contacting a mixture of said oil and solvent with a second solvent of incomplete miscibility with said oil, but of complete miscibility with said first solvent and with water, under conditions causing the formation of two phases, one of said phases comprising said oil and said second solvent, and the other phase comprising said first and second solvents, separating said phases, contacting the oil phase with water under conditions causing the formation of two additional phases, one of said additional phases comprising said oil, and the other additional phase comprising said second solvent and said water, and separating said additional phases.

2. A process for removing a solvent not completely miscible with water from a petroleum oil fraction, comprising contacting a mixture of said oil and solvent with a second solvent of incomplete miscibility with said oil, but of complete miscibility with said first solvent and with water, under conditions causing the formation of two phases, one of said phases comprising said oil and said second solvent, and the other phase comprising said first and second solvents, separating said phases, contacting the oil phase with water under conditions causing the formation of two additional phases, one of said additional phases comprising said oil, and the other additional phase comprising said second solvent and said water, subjecting said second solvent and water phase to distillation to effect at least a substantial separation of said second solvent and water, and recycling said second solvent and water after such separation.

3. A process for removing a solvent not completely miscible with water from a petroleum oil fraction comprising contacting a mixture of said oil and solvent with a second solvent of incomplete miscibility with said oil, but of complete miscibility with said first solvent and with water, under conditions causing the formation of two phases, one of said phases comprising said oil and said second solvent, and the other phase comprising said first and second solvents, separating said phases, contacting the oil phase with water under conditions causing the formation of two additional phases, one of said additional phases comprising said oil, and the other additional phase comprising said second solvent and said water, subjecting said second solvent and water phase to distillation to effect a substantial but incomplete separation of said second solvent and water, and recycling said second solvent and water after such separation.

4. A process for removing a solvent not completely miscible with water from a petroleum oil fraction comprising contacting a mixture of said oil and solvent with a second solvent of incomplete miscibility with said oil, but of complete miscibility with said first solvent and with water, under conditions causing the formaton of two phases, one of said phases comprising said oil and said second solvent and the other phase comprising said first and second solvents, separating said phases, contacting the oil phase with water under conditions causing the formation of two additional phases, one of said additional phases comprising said oil, and the other additional phase comprising said second solvent and said water, subjecting said second solvent and water phase to distillation to effect a complete separation of said second solvent and water, and recycling said second solvent and water after such separation.

5. A process for removing a solvent from a petroleum oil fraction, comprising contacting a mixture of said oil and solvent in continuous countercurrent with a second solvent of incomplete miscibility with said oil, but of complete miscibility with said first solvent and with water, under conditions causing the formation of two phases, one of said phases comprising said oil and said second solvent, and the other phase comprising said first and second solvents, separating said phases, contacting the oil phase with water in continuous countercurrent under conditions causing the formation of two additional phases, one of said additional phases comprising said oil, and the other additional phase comprising said second solvent and said water, subjecting said second solvent and water phase to distillation to effect at least a substantial separtion of said second solvent and water, and recycling said second solvent and water after such separation.

6. A process for removing a solvent from a petroleum oil fraction, comprising contacting a mixture of said oil and solvent in continuous countercurrent with a second solvent of incomplete miscibility with said oil, but of complete miscibility with said first solvent and with water, under conditions causing the formation of two phases, one of said phases comprising said oil and said second solvent, and the other phase comprising said first and second solvents, separating said phases, contacting the oil phase in continuous countercurrent with water under conditions causing the formation of two additional phases, one of said additional phases comprising said oil, and the other additional phase comprising said second solvent and said water, subjecting said second solvent and water phase to distillation to effect a substantial but incomplete separation of said second solvent and water, and recycling said second solvent and water after such separation.

7. A process for removing a solvent from a petroleum oil fraction, comprising contacting a mixture of said oil and solvent in continuous countercurrent with a second solvent of incomplete miscibility with said oil, but of complete miscibility with said first solvent and with water, under conditions causing the formation of two phases, one of said phases comprising said oil and said second solvent and the other phase comprising said first and second solvents, separating said phases, contacting the oil phase in continuous countercurrent with water under conditions causing the formation of two additional phases, one of said additional phases comprising said oil, and the other additional phase comprising said second solvent and said water, subjecting said second solvent and water phase to distillation to effect a complete separation of said second solvent and water, and recycling said second solvent and water after such separation.

8. A process comprising extracting a petroleum oil with a solvent, said extraction taking place under conditions causing the formation of two phases, separating said phases, contacting at least one of said separated phases with a second solvent of incomplete miscibility with said oil but of complete miscibility with said first solvent and with water, under conditions causing the formation of two additional phases, one of said additional phases comprising said oil and said second solvent, and the other additional phase comprising said first and second solvents, subjecting said last mentioned phase to distillation to effect at least a substantial separation of said first and second solvents, recycling said first and second solvents thus separated, contacting said last mentioned oil phase with water under conditions causing the formation of two further phases, one of said further phases comprising oil, and the other comprising said second solvent and water, subjecting said last mentioned phase to distillation to effect at least a substantial separation of said second solvent and water, and recycling said second solvent and water thus separated.

9. A process comprising extracting a petroleum oil in continuous countercurrent with a solvent under conditions causing the formation of two phases, separating said phases, contacting at least one of said separated phases in continuous countercurrent with a second solvent of incomplete miscibility with said oil, but of complete miscibility with said first solvent and with water, under conditions causing the formation of two additional phases, one of said additional phases comprising said oil and said second solvent and the other additional phase comprising said first and second solvents, subjecting said last mentioned phase to distillation to effect at least a substantial separation of said first and second solvents, recycling said first and second solvents thus separated, contacting said last mentioned oil phase in continuous countercurrent with water under conditions causing the formation of two further phases, one of said further phases comprising oil, and the other comprising said second solvent and water, subjecting said last mentioned phase to distillation to effect at least a substantial separation of said second solvent and water, and recycling said second solvent and water thus separated.

10. The process of refining mineral oils which comprises extracting the oil with a selective solvent for the more naphthenic portion thereof, forming a raffinate phase and an extract phase, each of which contains selective solvent, separating the phases, effecting contact between the extract phase and an organic wash solvent substantially completely miscible with the selective solvent and at such temperature and in such amount that there separates from the extract phase a layer predominantly oil which is of different composition from the oil in the extract phase being treated, and separating said layer.

MERRELL R. FENSKE.
WILBERT B. McCLUER.